(12) United States Patent
Videen

(10) Patent No.: US 6,414,797 B1
(45) Date of Patent: Jul. 2, 2002

(54) BEAMSPLITTER PRISM WITH SPHERICAL FACES FOR TRANSMITTING OR REFLECTING SPHERICAL WAVES WITHOUT MAGNIFICATION

(75) Inventor: Gorden Videen, Silver Spring, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 43 days.

(21) Appl. No.: 09/710,743

(22) Filed: Nov. 13, 2000

(51) Int. Cl.[7] ................................................. G02B 27/14
(52) U.S. Cl. ...................................................... 359/631
(58) Field of Search ................................. 359/631, 837, 359/620, 833, 639, 638, 640, 637, 727, 728, 729, 730, 733

(56) References Cited

U.S. PATENT DOCUMENTS 5,768,024 A * 6/1998 Takahashi ................... 359/631
6,185,046 B1 * 2/2001 Togino ........................ 359/631
6,208,468 B1 * 3/2001 Togino et al. ............... 359/637

* cited by examiner

Primary Examiner—Ricky Mack
Assistant Examiner—Omar Hindi
(74) Attorney, Agent, or Firm—Paul S. Clohan, Jr.

(57) ABSTRACT

A beamsplitter prism for transmitting and reflecting spherical waves without magnification, which includes at least first and second surfaces arranged opposite each other; a semi-reflecting layer diagonally arranged from a lower portion of the first surface to an upper portion of the second surface. The first and second surfaces are adapted to have a spherical shape, with the first surface having a smaller radius than the second surface to form two concentric spheres. A spherical wave which strikes the first surface will pass through the semi-reflecting layer and exit through the second surface without having the beamsplitter prism introduce distortion to the wave. The second surface may be substantially orthogonal to the first surface, so that a spherical wave may reflect off the semi-reflecting layer and exit through a spherical surface. A third planar surface may be arranged on the prism to permit the passage of plane waves without distortion.

20 Claims, 2 Drawing Sheets

BEAMSPLITTER PRISM WITH SPHERICAL FACES FOR TRANSMITTING OR REFLECTING SPHERICAL WAVES WITHOUT MAGNIFICATION

BACKGROUND OF THE INVENTION

1. Field of the Invention

The present invention relates to optical systems using a beamsplitter. More particularly, the present invention relates to an optical system including a beamsplitter, such as a beamsplitter prism, for transmitting or reflecting spherical waves without magnification.

2. Description of the Related Art

A beamsplitter divides an incident beam into two parts, with one part being transmitted and the other part being reflected. Normally, a beam splitter is placed at a 45° angle to the incident beam in order to reflect one part of the light at a 90° angle, and to allow another part of the light to pass through.

In addition, a beamsplitter can be used to combine two light beams (forming an apparent composite image) if the beamsplitter is positioned at an intersection of the two paths at a specific angle to each of the paths.

There are many types of beamsplitters, which include, for example, partially transparent metal films, plate-type beamsplitters having an optically symmetrical structure, prism-type beamsplitters, and beamsplitters which can reflect linear polarization and transmit orthogonally polarized light.

Of the beamsplitters mentioned above, beamsplitter prisms are often used in devices such as interferometers and many types of scanners.

In general, a beamsplitter prism is cubical and has a thin layer of semi-reflecting material placed diagonally across its interior. Approximately one half of the light entering one of the faces of the beamsplitter prism is reflected by the semi-reflecting material so that it exits an adjacent face. The rest of the light,is transmitted by the layer and passes through the opposite face.

Spherical waves are often implemented in imaging devices like scanners and copiers to image a line-source onto a line image, which means that these waves will pass through beamsplitter prisms.

However, the behavior of spherical waves is more complex than that of, for example, plane waves. Spherical waves pose a problem in that the transmission of a spherical wave emanating from a line undergoes distortion when passing through a conventional beamsplitter prism. In other words, the spherical wave appears to emanate from a location different than the actual location. As a result of this distortion, the spherical wave is no longer spherically shaped after exiting the beamsplitter prism.

The amount of distortion which is introduced on a spherical wave by the beamsplitter prism is dependent upon, inter alia, the type of material from which the prism is constructed and the size of the prism.

Accordingly, if a beamsplitter prism is used in conjunction with a backscattering detector, for measuring backscatter from a particle system, the amount of distortion introduced by the beamsplitter prism must be taken into account when calculating the scattering angle. This&.calculation causes the design of the detector to be more complex.

In addition, the distortion of the spherical wave caused by the beamsplitter prism may also affect the quality of scanning devices.

SUMMARY OF THE INVENTION

Accordingly, it is an object of the present invention to overcome the problems of the prior art.

To this end, according to the present invention, there is provided a beamsplitter prism for transmitting and reflecting spherical waves without magnification, the beamsplitter comprising:

at least first and second surfaces arranged opposite each other; and a semi-reflecting layer diagonally arranged from a lower portion of the first surface to an upper portion of the second surface, wherein the first and second surfaces have a spherical shape, the first surface has a smaller radius than the second surface, and the first and second surfaces form two concentric spheres, whereby a spherical wave which strikes the first surface passes through the semi-reflecting layer and exits through the second surface without the beamsplitter prism introducing distortion to the spherical wave.

In an embodiment, the beamsplitter may further comprise a third surface having a substantially planar shape and being substantially orthogonal to the first and second surfaces along an upper surface of the beamsplitter prism, whereby a plane wave which strikes the third surface is at least partly reflected by the semi-reflecting layer and exits through the first surface.

According to an aspect of the invention, the first surface may have a radius of curvature $R_1$ which is equal to a distance from the first surface to a point P that represents a point from which the spherical wave emanates.

In addition, the second surface may have a radius of curvature $R_2$ which is equal to a distance from the second surface to a point P that represents a point from which the spherical wave emanates.

According to another aspect of the invention, the third surface may be bent for counteracting a bending effect on a plane wave by the first surface.

In addition, a shape of the beamsplitter prism may be substantially cubical, and the first and second surfaces may constitute spherical lenses attached to opposite sides of the beamsplitter prism.

Alternatively, the first and second surfaces may constitute spherical lenses formed in their respective surface.

The first and second surfaces may constitute a plano-concave lenses, or a plano-convex lenses.

According to another embodiment of the present invention, there is provided a beamsplitter prism for transmitting and reflecting spherical waves without magnification, comprising:

at least first and second surfaces arranged opposite each other;

a third surface arranged substantially orthogonal to the first and second surfaces; and a semi-reflecting layer diagonally arranged from a lower portion of the first surface to an upper portion of the second surface;

wherein the first and third surfaces have a spherical shape, the first surface has a smaller radius than the third surface, a shape of the first surface and an image of the third surface form concentric spheres, whereby a spherical wave, which strikes the first surface, semi-reflects off the semi-reflecting layer and exits through the third surface, without the beamsplitter prism introducing distortion thereto.

According to an aspect of the invention, the third surface may have a radius of curvature $R_1$ which is equal to a distance from the first surface to a point P that represents a point from which the spherical wave emanates.

Additionally, the third surface may be bent to counteract a bending effect on a plane wave from the first surface so that the a shape of the plane wave bends after striking the third surface and is corrected by subsequently exiting through the first surface.

The second surface has a radius of curvature $R_2$ wherein $R_2=R_3+R_4$, where $R_3$ is equal to a distance from a lower edge of the semi-reflecting layer to point P, $R_4$ is equal to the distance along an upper edge of the first surface to the lower edge of the semi-reflecting layer, and point P represents a point from which the spherical wave emanates.

The shape of the beamsplitter prism may be substantially cubical, and the first and second surfaces may constitute spherical lenses attached to orthogonal sides of the beamsplitter prism.

Alternatively, the first and second surfaces each may constitute a spherical lens formed in a respective surface.

In another aspect of the present invention, at least one of the first and second surfaces may constitute a plano-concave lens.

In yet another aspect of the present invention, at least one of the first and second surfaces may constitute a plano-convex lens.

DETAILED DESCRIPTION OF THE PREFERRED EMBODIMENTS

Figure 1:
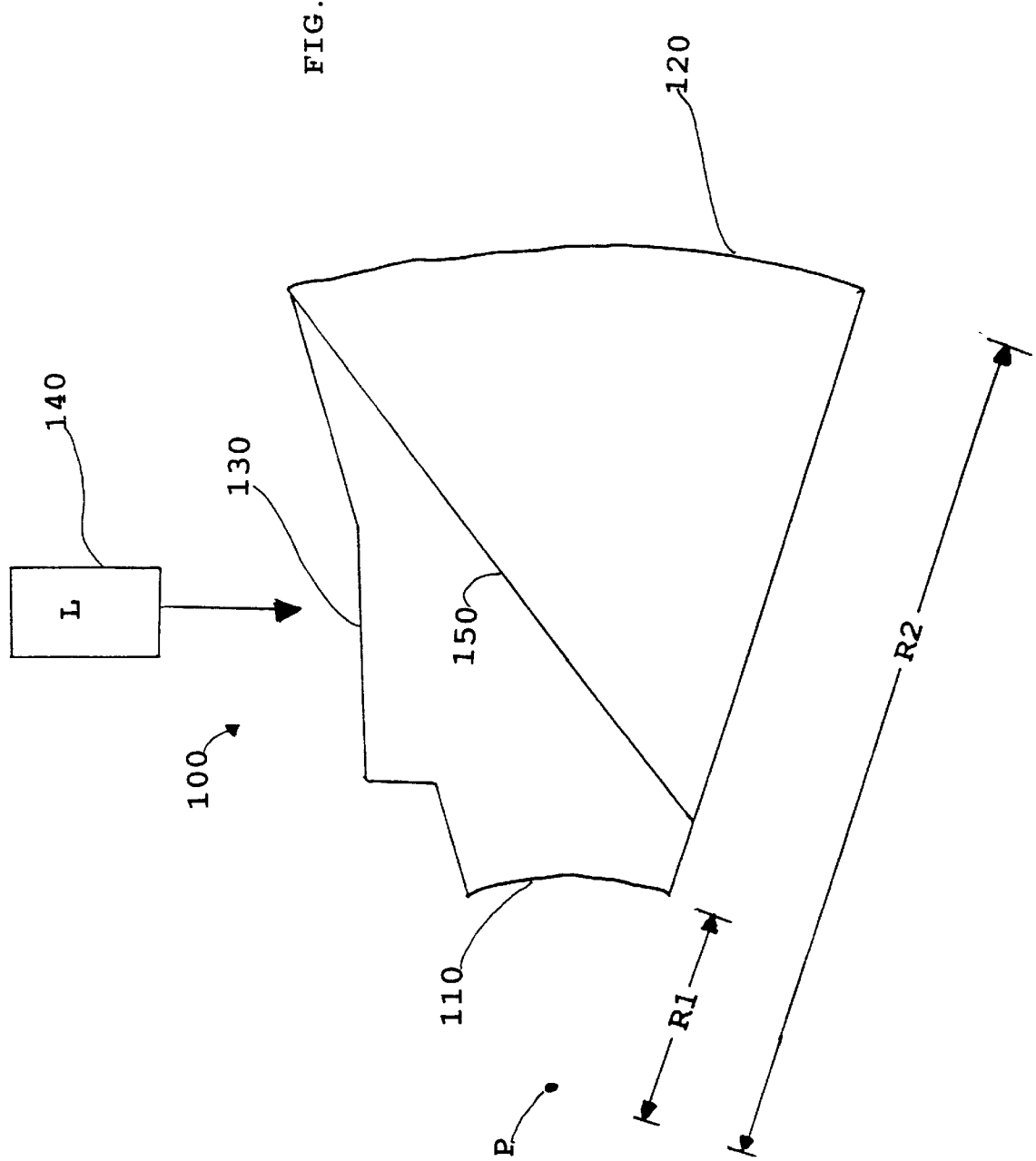
FIG. 1 illustrates a beamsplitter prism according to a first embodiment of the present invention.

FIG. 1 illustrates a first embodiment of the present invention. The beamsplitter prism 100 includes a first surface 110 which is spherical, and a second surface 120 which is spherical and arranged opposite the first surface 110 so that the two spherical surfaces form concentric spheres.

According to the present invention, spherical waves, which emanate from point P (extending out of the page of the drawing), strike the first surface 110 and exit through the second surface 120, without being bent by passage through the two surfaces because of their spherical shape.

As shown in FIG. 1, the first surface 110 may have a radius of curvature $R_1$, which is equal to the distance from the first surface to point P. For explanatory purposes, this means that if the first surface of the prism is arranged at a 10 mm distance from point P, the radius of curvature of $R_1$ should be 10 mm.

Similarly, the second surface 120 may have a radius of curvature $R_2$, which is equal to the distance from the second surface to point P.

A third surface 130 is planar and is arranged substantially orthogonal to the first surface 110. The third surface 130 may be suitable for transmission of a plane wave because of its planar surface, as opposed to the first and second surfaces 110, 120, which are adapted for transmission of a spherical wave because of their shape.

For example, plane wave light is transmitted from, for example, laser source 140 above the prism through the third surface 130. This plane wave light strikes a semi-reflecting material 150 (which is disposed diagonally in the prism) and a portion of this light exits through the first surface 110.

The spherical shape of the first surface 110 may affect the output of the plane wave which exits therethrough. Accordingly, the third surface 130 may be bent to counteract the effect caused after exiting through the spherical first surface 110, so that when a plane wave is transmitted from laser source 140 through the third surface 130, the wave will be slightly bent before reflecting off the semi-reflecting layer 150 and exiting via the first surface 110 where the shape of the first surface 110 corrects the distortion introduced by the third surface 130.

Thus, the plane wave will exit the beamsplitter prism without any distortion affect thereto as a result of the counteraction of the first and third surfaces 110, 130 of the prism on the shape of the plane wave.

Figure 2:
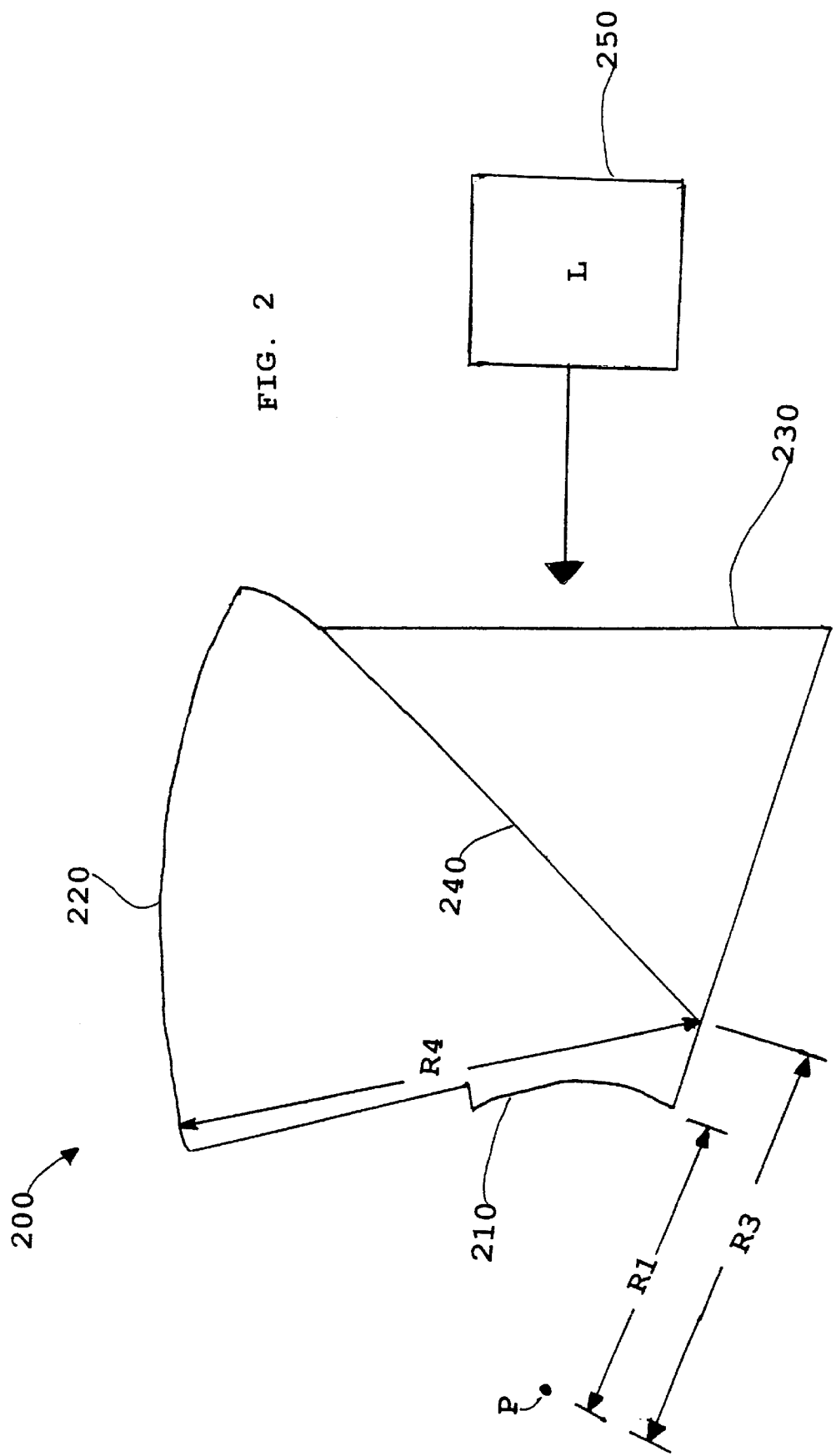
FIG. 2 illustrates a beamsplitter according to a second embodiment of the present invention.

FIG. 2 illustrates a second embodiment of the present invention.

According to the second embodiment, a beamsplitter prism 200 includes a first surface 210, which is spherical, a second surface 220, which is also spherical and substantially orthogonal to the first surface 210, and a planar third surface 230, which is positioned opposite the first surface 210.

This embodiment differs from the first embodiment in that the shape of the second and third surfaces 220, 230 (planar and spherical) in this second embodiment are reversed when compared with the second and third surfaces 110, 130 (spherical and planar) in the first embodiment.

According to this embodiment, during the transmission of a spherical wave from point P, the spherical wave will strike the first surface 210 without being bent because of the spherical shape of the first surface 210. The spherical wave is then reflected by the semi-reflecting material 240 toward the second surface 220, where it exits the prism without being bent because of the spherical shapes of both the second and third surfaces 220, 230.

As shown in FIG. 2, the surface radii of the first and second surfaces 210, 220 are chosen so that the image of the first surface 210 in the semi-reflecting layer 240 is concentric about the first surface 210. The first surface 210 has a radius of curvature $R_1$, which is equal to the distance from the first surface to point P. The second surface 220 has a radius of curvature of $R_2=R_3+R_4$, with $R_3$ being the distance from the lowermost edge of the semi-reflecting layer 150 to point P, and $R_4$ being the distance along an upper edge of the first surface 210 to the lower edge of the semi-reflecting layer 210. In addition, during the transmission of a plane wave, such as, for example a light beam from a laser source 250, the plane wave will enter the prism through the third surface 230, will be partially transmitted by the semi-reflecting material 240 and will exit through the first surface 210.

According to the present invention, it is possible to transmit a spherical wave through the beamsplitter prism to a detector without introducing distortion, so there is no need to compensate for the bending of the spherical wave, unlike prior art systems using beamsplitter prisms which employ bending compensation.

The beamsplitter prism and the semi-reflecting layer may be made of various materials which depend on the specific application requirements. For example, the semi-reflecting layer may be selected to reflect ½, ⅓ or any proportion of the incident light, as desired.

In addition, the first surface may be planar, spherical or aspherical.

Ideally, the radial subtense of surfaces 110 and 120 are identical, but this is not critical. The system may be constructed by attaching plano-concave and plano-convex spherical lenses to the surfaces of, for example, a cubical prism, to achieve the spherical configuration. Spherical lenses may be attached to or fashioned of the beamsplitter material.

In each of the embodiments shown in FIGS. 1 and 2, the first and second spherical surfaces may constitute spherical lenses attached to sides of the beamsplitter prism.

Various modifications and adaptations may be made to the present invention by those skilled in the art which fall within the scope and spirit of the appended claims. For example, the beamsplitter prism could have more or less than six sides, and could have more than two surfaces which are spherically shaped. In addition, the arrangement of the semi-reflecting material may be other than diagonal. The light source which provides plane waves is optional, and need not radiate laser light.

What is claimed is:

1. A beamsplitter prism for transmitting and reflecting spherical waves without magnification, said beamsplitter prism comprising:

at least first and second surfaces arranged opposite each other; and a semi-reflecting layer diagonally arranged from a lower portion of said first surface to an upper portion of said second surface, wherein said first and second surfaces have a spherical shape, said first surface has a smaller radius than said second surface, and said first and second surfaces form two concentric spheres, whereby a spherical wave which strikes said first surface passes through said semi-reflecting layer and exits through said second surface without said beamsplitter prism introducing distortion to said spherical wave.

2. The beamsplitter prism according to claim 1, further comprising:

a third surface having a substantially planar shape and being substantially orthogonal to said first and second surfaces along an upper surface of said beamsplitter prism, whereby a plane wave which strikes said third surface is at least partly reflected by said semi-reflecting layer and exits through said first surface.

3. The beamsplitter prism according to claim 1, wherein said first surface has a radius of curvature $R_1$ which is equal to a distance from said first surface to a point P that represents a point from which the spherical wave emanates.

4. The beamsplitter prism according to claim 2, wherein said first surface has a radius of curvatures $R_1$ which is equal to a distance from said first surface to a point P that represents a point from which the spherical wave emanates.

5. The beamsplitter prism according to claim 1, wherein said second surface has a radius of curvature $R_2$ which is equal to a distance from said second surface to a point P that represents a point from which the spherical wave emanates.

6. The beamsplitter prism according to claim 3, wherein said second surface has a radius of curvature $R_2$ which is equal to a distance from said second surface to the point P.

7. The beamsplitter prism according to claim 2, wherein said third surface is bent for counteracting a bending effect on a plane wave by said first surface.

8. The beamsplitter prism according to claim 2, wherein a shape of said beamsplitter prism is substantially cubical, and said first and second surfaces constitute spherical lenses attached to opposite sides of said beamsplitter prism.

9. The beamsplitter prism according to claim 2, wherein a shape of said beamsplitter prism is substantially cubical, and said first and second surfaces constitute spherical lenses formed in their respective surface.

10. The beamsplitter prism according to claim 2, wherein each of said first and second surfaces constitute a plano-concave lens.

11. The beamsplitter prism according to claim 2, wherein each of said first and second surfaces constitute a plano-convex lens.

12. A beamsplitter prism for transmitting and reflecting spherical waves without magnification, comprising:

at least first and second surfaces arranged opposite each other;

a third surface arranged substantially orthogonal to said first and second surfaces; and a semi-reflecting layer diagonally arranged from a lower portion of said first surface to an upper portion of said second surface;

wherein said first and third surfaces have a spherical shape, said first surface has a smaller radius than said third surface, a shape of said first surface and an image of said third surface form concentric spheres, whereby a spherical wave, which strikes said first surface, semi-reflects off said semi-reflecting layer and exits through said third surface, without said beamsplitter prism introducing distortion thereto.

13. The beamsplitter prism according to claim 12, wherein said third surface has a radius of curvature $R_1$ which is equal to a distance from said first surface to a point P that represents a point from which the spherical wave emanates.

14. The beamsplitter prism according to claim 12, wherein said third surface is bent to counteract a bending effect on a plane wave from said first surface so that said a shape of said plane wave bends after striking said third surface and is corrected by subsequently exiting through said first surface.

15. The beamsplitter prism according to claim 12, wherein said second surface has a radius of curvature $R_2$ wherein $R_2=R_3+R_4$, where $R_3$ is equal to a distance from a lower edge of the semi-reflecting layer to point P, $R_4$ is equal to the distance along an upper edge of the first surface to said lower edge of the semi-reflecting layer, and point P represents a point from which the spherical wave emanates.

16. The beamsplitter prism according to claim 13, wherein said second surface has a radius of curvature $R_2$ wherein $R_2=R_3+R_4$, where $R_3$ is equal to a distance from a lower edge of the semi-reflecting layer to a point P, and $R_4$ is equal to a distance along an upper edge of the first surface to said lower edge of the semi-reflecting layer.

17. The beamsplitter prism according to claim 12, wherein a shape of said beamsplitter prism is substantially cubical, and said first and second surfaces constitute spherical lenses attached to orthogonal sides of said beamsplitter prism.

18. The beamsplitter prism according to claim 12, wherein a shape of said beamsplitter prism is substantially cubical, and said first and second surfaces each constitute spherical lenses formed in each respective surface.

19. The beamsplitter prism according to claim 12, wherein at least one of said first and second surfaces constitutes a plano-concave lens.

20. The beamsplitter prism according to claim 12, wherein at least one of said first and second surfaces constitutes a plano-convex lens.

* * * * *